United States Patent
Van Nieuwenhuyze et al.

(10) Patent No.: US 9,225,687 B2
(45) Date of Patent: Dec. 29, 2015

(54) ACCESS CONTROL MECHANISM FOR A SECURE ELEMENT COUPLED TO AN NFC CIRCUIT

(75) Inventors: Olivier Van Nieuwenhuyze, Wezembeek-Oppem (BE); Thierry Huque, Grand-Rosiere (BE); Alexandre Charles, Auriol (FR)

(73) Assignees: PROTON WORLD INTERNATIONAL N.V., Zaventem (BG); STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 14/009,786

(22) PCT Filed: Apr. 6, 2012

(86) PCT No.: PCT/FR2012/050762
§ 371 (c)(1),
(2), (4) Date: Mar. 27, 2014

(87) PCT Pub. No.: WO2012/143653
PCT Pub. Date: Oct. 26, 2012

(65) Prior Publication Data
US 2014/0201815 A1    Jul. 17, 2014

(30) Foreign Application Priority Data

Apr. 13, 2011    (FR) ..................................... 11 01134

(51) Int. Cl.
*G06Q 20/32* (2012.01)
*H04L 29/06* (2006.01)
(Continued)

(52) U.S. Cl.
CPC ............ *H04L 63/04* (2013.01); *G06F 21/6209* (2013.01); *G06F 21/77* (2013.01);
(Continued)

(58) Field of Classification Search
CPC .. H04L 63/10; H04L 63/107; G06Q 20/3278; G06Q 20/3229; G06Q 20/352
USPC ....................................... 455/411; 726/11–14
See application file for complete search history.

(56) References Cited

U.S. PATENT DOCUMENTS

| 6,070,243 A | 5/2000 | See et al. |
| 6,092,191 A | 7/2000 | Shimbo et al. |

(Continued)

FOREIGN PATENT DOCUMENTS

| CN | 1596018 A | 3/2005 |
| CN | 1933351 A | 3/2007 |

(Continued)

OTHER PUBLICATIONS

Rieback, M.R., et al., Keep on Blockin' in the Free World: Personal Access Control for Low-Cost RFID Tags, Apr. 20, 2005, Security Protocols; [Lecture Notes in Computer Science], Sprnger Berlin Heidelberg, Berlin, Heidelberg, pp. 51-59 XP019085239.

(Continued)

*Primary Examiner* — Tae Kim
(74) *Attorney, Agent, or Firm* — Seed IP Law Group PLLC

(57) ABSTRACT

A method for protecting a security module equipping a telecommunication device equipped with a near-field communication router, against an attempt of diversion of a communication channel between a gate of this security module and a gate of the router, wherein, for each request from the router to the security module, the module verifies the rights of access to the information that is contains according to the origin of the request.

16 Claims, 4 Drawing Sheets

(51) Int. Cl.
- *G06F 21/62* (2013.01)
- *G06F 21/77* (2013.01)
- *H04W 12/08* (2009.01)
- *H04W 12/12* (2009.01)
- *G06Q 20/20* (2012.01)

(52) U.S. Cl.
CPC ........... *G06Q 20/20* (2013.01); *G06Q 20/3278* (2013.01); *H04W 12/08* (2013.01); *H04W 12/12* (2013.01); *G06F 2221/2141* (2013.01); *H04L 63/0492* (2013.01)

(56) References Cited

U.S. PATENT DOCUMENTS

| | | | |
|---|---|---|---|
| 7,974,536 | B2 | 7/2011 | Yu et al. |
| 2004/0023220 | A1 | 2/2004 | Greenfield et al. |
| 2004/0065735 | A1 | 4/2004 | Christoffers et al. |
| 2004/0232220 | A1* | 11/2004 | Beenau ............... G01D 21/00 235/380 |
| 2005/0013310 | A1 | 1/2005 | Banker et al. |
| 2007/0263596 | A1 | 11/2007 | Charrat |
| 2008/0085001 | A1 | 4/2008 | Charrat et al. |
| 2008/0219444 | A1 | 9/2008 | Benteo et al. |
| 2008/0296978 | A1 | 12/2008 | Finkenzeller et al. |
| 2009/0106824 | A1 | 4/2009 | Morel et al. |
| 2009/0206984 | A1* | 8/2009 | Charrat et al. ............. 340/5.2 |
| 2010/0084465 | A1 | 4/2010 | Jolivet |
| 2010/0090805 | A1 | 4/2010 | Libotte |
| 2010/0137025 | A1 | 6/2010 | Tal et al. |
| 2010/0161403 | A1 | 6/2010 | Fisher et al. |
| 2010/0178867 | A1* | 7/2010 | Charrat ..................... 455/41.1 |
| 2010/0178868 | A1* | 7/2010 | Charrat ..................... 455/41.1 |
| 2010/0210300 | A1 | 8/2010 | Rizzo et al. |
| 2010/0227553 | A1 | 9/2010 | Charrat et al. |
| 2010/0245054 | A1 | 9/2010 | Kim |
| 2010/0259216 | A1 | 10/2010 | Capomaggio |
| 2011/0065398 | A1 | 3/2011 | Liu et al. |
| 2011/0226853 | A1 | 9/2011 | Soh et al. |
| 2011/0237190 | A1 | 9/2011 | Jolivet |
| 2011/0269423 | A1 | 11/2011 | Schell et al. |
| 2012/0052801 | A1* | 3/2012 | Kulkarni ..................... 455/41.1 |
| 2012/0190299 | A1 | 7/2012 | Takatsuka et al. |
| 2012/0190332 | A1* | 7/2012 | Charles ..................... 455/410 |
| 2013/0057640 | A1 | 3/2013 | Callahan |
| 2013/0059563 | A1 | 3/2013 | Huque et al. |
| 2013/0059566 | A1* | 3/2013 | Huque et al. ............... 455/411 |
| 2013/0059567 | A1 | 3/2013 | Huque et al. |
| 2013/0059568 | A1* | 3/2013 | Huque et al. ............... 455/411 |
| 2013/0217325 | A1 | 8/2013 | Ingels |
| 2013/0225125 | A1 | 8/2013 | Hugue et al. |
| 2013/0337770 | A1 | 12/2013 | Huque et al. |
| 2014/0041036 | A1 | 2/2014 | Huque et al. |
| 2014/0289833 | A1 | 9/2014 | Briceno et al. |

FOREIGN PATENT DOCUMENTS

| | | |
|---|---|---|
| CN | 101079013 A | 11/2007 |
| CN | 101202621 A | 6/2008 |
| CN | 101491052 A | 7/2009 |
| CN | 101536008 | 9/2009 |
| EP | 1 909 431 A1 | 4/2008 |
| EP | 1 928 099 A1 | 6/2008 |
| EP | 2 034 705 A1 | 3/2009 |
| EP | 2 219 353 A1 | 8/2010 |
| FR | 2 921 786 A1 | 4/2009 |
| WO | WO 2007068993 A1 * | 6/2007 |
| WO | 2007/093580 A1 | 8/2007 |
| WO | 2009/115997 A2 | 9/2009 |
| WO | 2009/147094 A1 | 12/2009 |

OTHER PUBLICATIONS

English language translation of Written Opinion of the International Searching Authority dated Oct. 15, 2013 from corresponding International Application No. PCT/FR2012/050762.
ETSI TS 102 622, "Smart Cards; UICC—Contactless Front-end (CLF) Interface; Host Controller Interface (HCI) (Release 7)," V7.4.0, Technical Specification, Apr. 2009, 53 pages.
ETSI TS 102 622, "Smart Cards; UICC—Contactless Front-end CLF) Interface; Host Controller Interface (HCI) (Release 7)," V7.5.0, Technical Specification, Jun. 2009, 53 pages.
ETSI TS 102 622, "Smart Cards; UICC—Contactless Front-end (CLF) Interface; Host Controller Interface (HCI) (Release 10)," V10.2.0, Technical Specification, Mar. 2011, 56 pages.
ETSI TS 102 695-2, "Smart Cards; Test specification for the Host Controller Interface (HCI); Part 2: UICC features (Release 7)," V7.2.0, Technical Specification, Oct. 2010, 62 pages.
Francis et al., "Potential Misuse of NFC Enabled Mobile Phones with Embedded Security Elements as Contactless Attack Platforms," The Institute of Electrical and Electronics Engineers, Inc., 2009, 8 pages.
French Search Report, dated Oct. 19, 2010, for French Application No. 1051693, 6 pages.
French Search Report, dated Oct. 21, 2010, for French Application No. 1051694, 7 pages.
French Search Report, dated Oct. 11, 2010, for French Application No. 1051695, 7 pages.
French Search Report, dated Nov. 23, 2010, for French Application No. 1051696, 7 pages.
French Search Report, dated May 4, 2011, for French Application No. 1060819, 6 pages.
International Search Report, mailed Apr. 6, 2011, for International Application No. PCT/EP2011/052899, 2 pages.
International Search Report, mailed Apr. 19, 2011, for International Application No. PCT/EP2011/052902, 2 pages.
International Search Report, mailed May 19, 2011, for International Application No. PCT/EP2011/052907, 3 pages.
International Search Report, mailed Jun. 8, 2011, for International Application No. PCT/EP2011/052930, 3 pages.
International Search Report, mailed Jun. 6, 2012, for International Application No. PCT/EP2012/055312, 2 pages.
International Search Report, mailed Mar. 23, 2012, for International Application No. PCT/FR2011/053023, 4 pages.
International Search Report and Written Opinion, mailed Nov. 28, 2011, for International Application No. PCT/EP2011/064639, 14 pages.
International Search Report and Written Opinion, mailed Jan. 25, 2012, for International Application No. PCT/EP2011/064643, 25 pages.
Madlmayr et al., "Management of Multiple Cards in NFC-Devices," LNCS 5189, CARDIS 2008, pp. 149-161. (14 pages).
Madlmayr et al., "NFC Devices: Security and Privacy," The Third International Conference on Availability, Reliability and Security, pp. 642-647, 2008. (6 pages).
Pasquet et al., "Payment with mobile NFC phones—How to analyze the security problems," 2008 International Symposium on Collaborative Technologies and Systems (CTS 2008), 8 pages.
Written Opinion, mailed Mar. 9, 2010, for International Application No. PCT/EP2011/052899, 8 pages.
Written Opinion, mailed Apr. 19, 2011, for International Application No. PCT/EP2011/052902, 6 pages.
Written Opinion, mailed May 19, 2011, for International Application No. PCT/EP2011/052907, 8 pages.
Written Opinion, mailed Jun. 8, 2011, for International Application No. PCT/EP2011/052930, 8 pages.
Written Opinion, mailed Jun. 6, 2012, for International Application No. PCT/EP2012/055312, 8 pages.
Written Opinion, mailed Mar. 23, 2012, for International Application No. PCT/FR2011/053023, 6 pages.

* cited by examiner

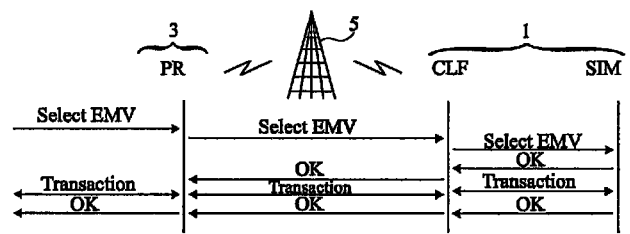
Fig 4
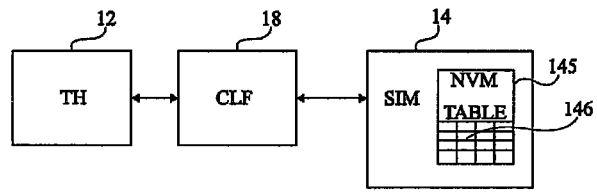
Fig 6
| APPLI | Log Source ID | Right |
|---|---|---|
| 1 | 00 | N |
| 1 | 02 | Y |
| 2 | 00 | N |
| 2 | 01 | Y |
← 146
Fig 7

ACCESS CONTROL MECHANISM FOR A SECURE ELEMENT COUPLED TO AN NFC CIRCUIT

CROSS REFERENCE TO RELATED APPLICATIONS

The present application is the National Stage of international application No. PCT/FR2012/050762, filed Apr. 6, 2012, which claims priority benefit of French patent application no. 11/01134, filed Apr. 13, 2011, which applications are hereby incorporated by reference to the maximum extent allowable by law.

BACKGROUND

1. Technical Field

Embodiments generally relate to transactions performed by means of mobile telecommunication devices of cell phone type. Embodiments more specifically apply to such devices, further equipped with a near field communication circuit (NFC).

2. Discussion of the Related Art

Cell phones are more and more often equipped with a near-field communication interface which enables them to combine electromagnetic transponder functions with mobile telephony functions. In particular, this adds functions of emulation of an electromagnetic transponder, of contactless card type or contactless card reader type, to the mobile telecommunication device, for example a personal digital assistant, a cell phone, a smartphone, etc. This considerably enhances the features of the mobile device, which can then be used, for example, as an electronic purse, as an access or transport ticket validation device, etc.

To emulate the operation of a contactless chip card, the mobile telecommunication device is equipped with a contactless front-end integrated circuit (CLF), also called NFC router. This router is equipped with a radio frequency (RF) transceiver front head associated with a low-range antenna to communicate like an electromagnetic transponder. The router uses the capacities of the processor(s) of the mobile device for data processing and storage operations. For access control, electronic purse, payment, and other applications, a secure element enabling to authenticate the user is used. This secure element is either integrated to the mobile telecommunication device (dedicated integrated circuit, circuit welded to the printed circuit board) or contained in a microcircuit supported by a subscriber identification module (SIM), or any other removable card, for example at the standard format of a memory card.

An NFC router may also be present in a mobile device of USB key type, in a bank teller terminal, in an adhesive device (sticker), etc.

A contactless card emulation in a mobile telecommunication device is capable of generating weak points in terms of transaction security.

It would be desirable to avoid such weak points to secure transactions.

SUMMARY

An embodiment aims at overcoming all or part of the disadvantages of mobile telecommunication devices associated with a near-field transmission module.

Another embodiment aims at improving the security against a hacking attempt on a security module of subscriber identification module type, contained in a telecommunication device associated with a near-field transmission module.

Thus, an embodiment provides a method for protecting a security module equipping a telecommunication device equipped with a near-field communication router, against an attempt of diversion of a communication channel between a gate of this security module and a gate of the router, wherein, for each request from the router to the security module, said module verifies the rights of access to the information that is contains according to the origin of the request.

According to an embodiment, the security module only allows a transaction if the request originates from a near-field communication.

Another embodiment also provides a security module intended for a telecommunication device equipped with a near field communication router, comprising a non-volatile memory for storing the rights of access in accordance with the above method.

According to an embodiment, said memory contains a table containing, for each request capable of being received, a router gate identifier and an identifier of the logical source from which the request originates.

According to an embodiment, the right of access is conditioned by the logical source.

Another embodiment provides a telecommunication device equipped with a near-field communication router and with a security module.

The foregoing and other objects, features, and advantages will be discussed in detail in the following non-limiting description of specific embodiments in connection with the accompanying drawings.

BRIEF DESCRIPTION OF THE DRAWINGS

FIG. 4 illustrates an example of how an attack applied to the EMV payment standard develops;

FIG. 6 is a simplified block diagram of an embodiment of a mechanism of protection against an attack of the type illustrated in FIGS. 3 and 5;

FIG. 7 illustrates in the form of a table an embodiment;

DETAILED DESCRIPTION

Figure 1:
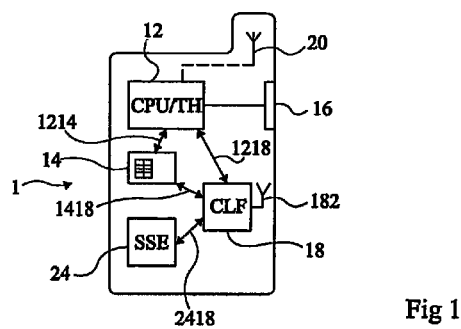
FIG. 1 schematically shows a mobile telecommunication device of the type to which embodiments apply as an example.

The same elements have been designated with the same reference numerals in the different drawings. For clarity, only those elements and steps which are useful to the understanding of the embodiments have been shown and will be described. In particular, the coding and communication protocols, be it for near-field transmissions or for telecommunications in GSM mode, have not been detailed, the embodiments being compatible with usual protocols. Further, the circuits forming the mobile communication device have not been detailed either, the embodiments being here again compatible with usual devices, provided for them to be programmable.

FIG. 1 very schematically shows a mobile telecommunication device (for example, a cell phone) of the type to which the embodiments apply as an example. The different elements of interface with the user (keyboard, display, speakers, etc.) have not been shown, since these elements are not modified by the implementation of the embodiments which will be described.

Device 1 comprises a central processing unit 12 (CPU/TH) formed of at least one microcontroller forming the device core. This microcontroller is conventionally called terminal host. For the telecommunication operation over a network (GSM, 3G, UMTS, etc.), the microcontroller uses identification and authentication data provided by a subscriber identification module 14 (SIM) which forms a security module of the device. Microcontroller 12 is capable of using one or several internal memories, not shown, of the telephone. Telephone 1 may also comprise a memory card reader 16 or other buses of communication with the outside to load data and/or applications into the telephone.

Mobile devices to which the described embodiments apply combine the telecommunication function with that of a near-field contactless transmission system (NFC). To achieve this, device 1 comprises a circuit 18 (CLF) forming a near-field communication module, like an electromagnetic transponder. Module 18, also called NFC router, is associated with an antenna 182 distinct from an antenna 20 intended for the mobile telephony network. Circuit 18 may be associated with a security module (SSE) 24 distinct from SIM card 14 and directly present on the printed circuit board of the telephone, or supported by a removable microcircuit card (for example, in the format of a memory card). A security module is an electronic circuit for securely executing applications, guaranteeing the security (secret/integrity) of data manipulated by such applications.

The different elements of device 1 communicate according to various protocols. For example, circuits 12 and 18 communicate over a link 1218 of I2C (or SPI) type, SIM card 14 communicates with microcontroller 12 over a link 1214 according to ISO standard 7816-3, and security module 24 communicates with router 18 according to this standard over a link 2418. Router 18 communicates with the SIM card, for example, over a single-wire bus 1418 (SWP—Single Wire Protocol). Other versions of protocols and links are of course possible.

Embodiments will be described in relation with a GSM telephone. Embodiments however more generally apply to any telecommunication device adapted to a mobile network (for example, Wifi, Bluetooth, WiMax, etc.) and associated with a contactless transmission module (NFC router), for example, a USB key, a bank terminal, a power consumption meter, or others), an access or transport ticket validation terminal, etc.

Similarly, the near-field communication module will be called router since it generally integrates all the functions useful for the emulation of a contactless card within a same circuit, the described embodiments however applying to any NFC-type module.

Router 18 comprises physical terminals of connection to links 1218, 1418, and 2418 and manages logic gates for assigning these terminals to the different functions associated with near-field communications. Router 18 thus comprises a processor and volatile and non-volatile memories for storing, among others, a routing table for the different logic gates. Some gates are reserved for router administration functions while others can be freely assigned by the router.

In operation, router 18 makes available and manages different pipes of communication with the other circuits 12, 14, 24, etc. of the mobile device to give them access to the near-field communication functions, that is, to gates connected to radio frequency transmission circuits, called radio frequency or RF gates.

Figure 2:
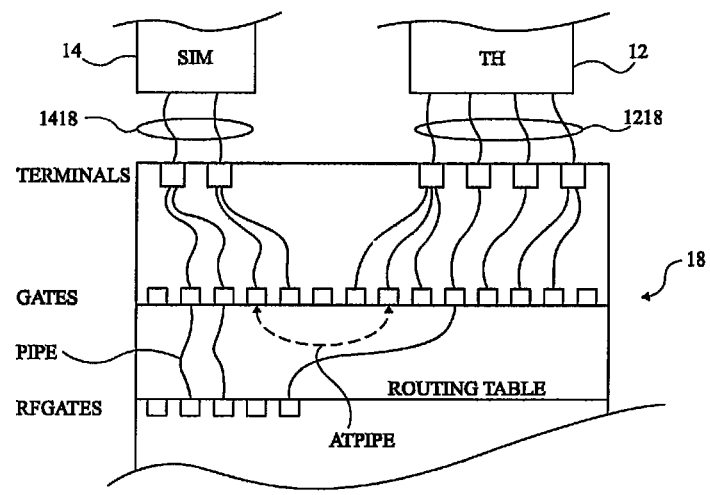
FIG. 2 is a diagram illustrating a function of a near-field transmission module of the device of FIG. 1.

FIG. 2 very schematically illustrates, in the form of blocks, the routing function of router 18. For simplification, FIG. 2 is a structural representation while, in practice, the assignment of the different gates to the different circuits of the mobile device is a software operation performed by the routing table.

Each of the router terminals (TERMINALS) is assigned one or several gates (GATES). In the example of FIG. 2, it is assumed that physical links 1418 and 1218 of SIM card 14 and of microcontroller 12 are connected to terminals of router 18 and that gates are assigned to these circuits. Several gates may be assigned to a same circuit (which is symbolized in FIG. 2 by the connection of a same terminal to several gates). The routing table (ROUTING TABLE) of router 18 assigns some gates to internal functions (for example, configuration and administration functions), but also creates pipes (PIPE) between gates assigned to the SIM card or to the RF microcontroller, and gates (RFGATES) comprised in module 18. This corresponds to the creation of pipes (PIPE) between the circuits external to router 18 and these RF transmission circuits for the implementation of the different applications requiring a near-field communication. For example, in bank, transport, electronic purse, access, and other applications which require a secure identification or authentication of the user, one or several pipes are created between the router and the SIM card to use the secure user identification data and validate the transaction.

The integration of NFC routers in mobile telecommunication devices and the sharing of a same security module (SIM card or other) generate weak points in terms of security.

Authentication tools may be provided to make sure that the links between the router and the different external circuits are not pirated. However, this appears to be insufficient in view of a weak point that the present inventors have identified and which will be described hereafter.

Router or NFC module 18 generally is a single integrated circuit and its external accesses are rather well protected against possible hacking attempts.

Up to now, the main concern has been to guarantee that a near-field transaction emulated by the mobile device would not enable a pirate device intercepting the near-field communication to exploit the information provided by the security module.

However, there remains a risk, since router 18 also manages a pipe (ATPIPE, symbolized in dotted lines in FIG. 2) of communication between SIM card 14 or any other security module and microcontroller 12 of the mobile telecommunication device. This pipe is normally used so that SIM card 14 informs microcontroller 12 that a message reaches it over the NFC link. It is however also possible to divert this use to make security module 14 believe that it communicates with the router for a near-field transaction, and thus over a pipe with the RF gates of the telephone, while it is actually communicating with microcontroller 12.

Figure 3:
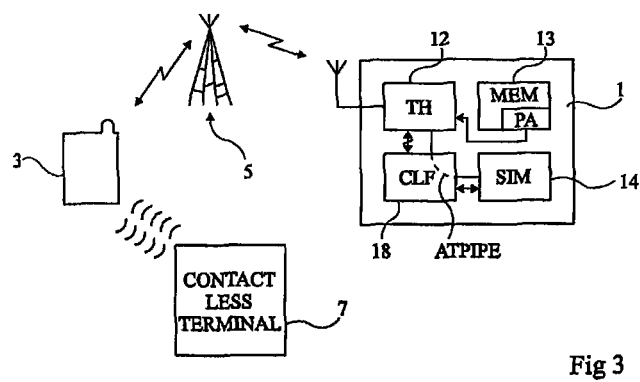
FIG. 3 very schematically illustrates an attack capable of exploiting a weakness of the telecommunication device of FIG. 1.

FIG. 3 very schematically illustrates in the form of blocks the possible exploitation of a pipe ATPIPE between a SIM card 14 and a microcontroller 12 of a cell phone 1.

It is assumed that, in a preparatory phase of the attack, GSM phone 1 has been hacked and a pipe ATPIPE has been diverted via router 18 between its SIM card 14 and its microcontroller 12. The routing table of router 18 thus contains the data of the "diverted" pipe. It is also assumed that a pirate application (PA) has been stored in a memory 13 (non volatile) of phone 1 and that this application may provide instructions to microcontroller 12. Several embodiments of the preparatory phase will be discussed subsequently.

The user of device 1, once said device has been hacked by the loading of application PA and by the creation of pipe ATPIPE, is not capable, as will be seen hereafter, to notice a malfunction. He uses his telephone normally.

One of the functions of application PA is to automatically trigger a response of phone 1 after a request originating from the telecommunication network and transmitted by another mobile device 3 owned by the attacker. The pirate device for example is another GSM phone 3 which uses its own subscriber identification module to communicate over the GSM network (symbolized by a relay antenna 5). It may also be a microcomputer associated with a GSM module.

In the example of FIG. 3, device 3 is also equipped with a contactless router, for example, to initiate near field transactions with a terminal 7 (for example, an NFC terminal or any other contactless communication terminal). For example, device 3 is used to make a purchase with a payment to be validated by its NFC router.

Normally, for such a payment, the router of telephone 3 manages a communication pipe with the subscriber identification module (or any other dedicated security module) of this telephone to authenticate the user and validate the payment.

FIG. 4 illustrates an example of exchange at the time of the payment validation in a mechanism such as illustrated in FIG. 3.

Telephone 3 or pirate device PR receives, from its NFC module, a payment validation request. Such a request is for example supported by an application according to the EMV standard (Eurocard-Mastercard-Visa). The NFC router of telephone 3 thus receives an instruction of selection of its EMV application (SELECT EMV). Instead of using its own security module, telephone 3 uses GSM network 5 to ask distant telephone 1 to validate the payment by means of subscriber identification module 14. For example, device 3 sends an SMS over network 5 which, when received by telephone 1, is processed by the pirate application. This SMS for example contains an instruction of selection of the EMV application (SELECT EMV). On the side of telephone 1, the pirate application simulates the requests originating from the RF gate and uses microcontroller 12 to transmit these requests to router 18 (CLF) which forwards them over pipe ATPIPE to identification module 14 (SIM). The latter thus receives instruction SELECT EMV and validates the selection of the EMV application. This validation is diverted by the pirate application executed on microcontroller 12 and returned to device 3. The obtaining, by the pirate device, of the validation of application EMV of security module 18 of device 1 is exploited by its NFC router to communicate with payment terminal 7. The entire payment transaction is conveyed by this pirated pipe until the payment validation (OK) by the SIM card of telephone 1 transmitted by the GSM network, and then by telephone 3 to terminal 7. As a result, the payment is debited to the subscriber of telephone 1 and not to the attacker who owns device 3. Most often, a contactless application requires no interaction with the terminal (7, FIG. 3) except for a presentation of the contactless device. In particular, no code (PIN) keying is required for a near-field communication to avoid lengthening transactions, whereby device 3 may easily hack distant device 1.

The countermeasures providing encryptions and/or signatures between terminal 7 requesting the authentication and the security module are ineffective to counter this attack. Indeed, the data between terminal 7 and module 14 need no decoding. A communication pipe has actually been established between module 14 of telephone 1 and terminal 7 via telecommunication network 5, so that module 14 behaves as if it was in near field transaction with terminal 7.

The same type of piracy may occur for passage authentication or validation applications, of secure access type.

Further, this attack may also be successful even without for pirate device 3 to use its own NFC router, for example, if it uses a contactless communication mode, provided for the requested authentication to originate from a security module and to respect the formats and protocols used by the NFC protocol. Further, such an attack may be used to divert any data from device 1 in favor of a pirate system (for example, data duplicating the content of the magnetic track of a card in a bank payment application).

Further, the attack may involve the SIM card of cell phone 1 or of any other security module (for example, module 24, FIG. 1), provided for the pipe to be managed by router 18 between this module and a circuit (generally, microcontroller 12) capable of managing communications over network 5.

Such a near-field transaction attack, exploiting the telecommunication network, is due to the presence of a pipe of communication, via the NFC router, between the security module and a microcontroller connected to this router.

Implementing the attack requires a preparatory phase in which an intervention of the telephone 1 which is desired to be pirated is necessary.

This preparation requires an intervention depending on the security level provided by the SIM card to the NFC communication pipe management.

In a simplified embodiment, the microcontroller is allowed to create a pipe on any free gate. In this case, a pirate application loaded into the microcontroller is capable of creating a pipe through the NFC router to the SIM card. If, afterwards, the SIM card performs no other checking than to acknowledge that the format of the requests corresponds to the format of a radio frequency frame originating from an NFC circuit, the pirate application may attack the SIM card.

According to another embodiment; security module 14 is more advanced and checks the association between the numbers of the pipes or of its own gates and the RF gates.

In the first case, it is considered that SIM card 14 does not take into account the circuit with which the gate is created (and thus, the fact that it may be a gate intended for the microcontroller). This embodiment uses the fact that the assignment of the pipe numbers (identifiers) is often sequential. It is first started by asking the microcontroller to suppress a pipe between the SIM card and the RF gates. Then, a pipe having the same identifier between the microcontroller and the SIM card is created.

Figure 5:
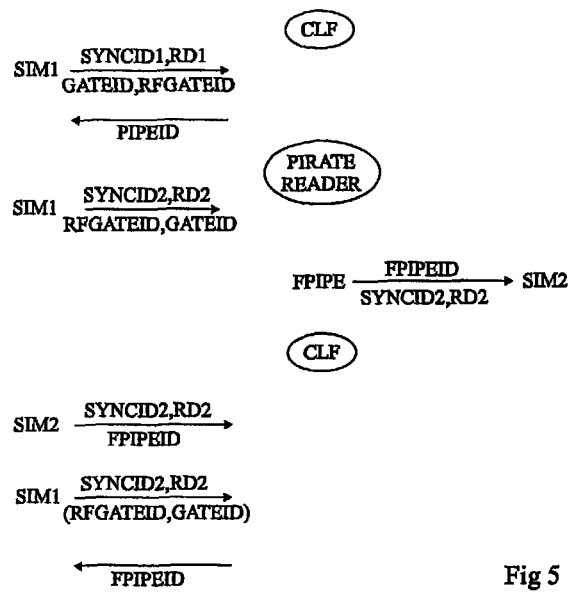
FIG. 5 illustrates an embodiment of a preparatory phase of such an attack.

FIG. 5 illustrates another embodiment of a preparatory phase of the attack aiming at diverting a pipe between router 18 (CLF) and the SIM card (SIM1) of a user. This embodiment is more specifically intended for the second above example where the SIM card makes sure, before transmitting data to the CLF router, that it has effectively controlled the creation of the communication pipe with said router. The fact that, prior to the initialization of device 1, the SIM card verifies whether it has already been in the presence of router 18 is here exploited. If not, the card reconfigures the channels between its gates and the NFC router.

In a normal operation, at the first connection of card SIM1 in telephone 1, the card causes the creating, at the level of a so-called transport layer, of at least one communication pipe, identified as SYNCID1, with the CLF router. For this purpose, card SIM1 sends to the CLF router both synchronization data SYNCID1 and a number (typically, a random number RD1). Number RD1 is stored in the CLF router and is used by card 14 to check that it has already caused the creation of a pipe with this router. On each initialization, the card verifies the existence of number RD1 in the router. To achieve this, the card requests from the router to create a pipe between one of its gates, identified as GATEID, and one of the RF gates, identified as RFGATEID. The router then creates a pipe and assigns it an identifier PIPEID and, at the same time, stores said identifier in the routing table and communicates it to card SIM1. Each time data are requested by the router, card SIM1 verifies that identifier PIPEID of the pipe is correct.

To implement the attack, the hacker should have cell phone 1 and card SIM1 in his possession for a period of time. This is relatively easy, for example, by asking the owner of the cell phone to lend it to supposedly make a call, or by fraudulently using a phone during a maintenance operation, for example, in a mobile telephony shop.

With card SIM1 and the telephone provided with router 1, the pirate starts by introducing card SIM1 into a pirate device (PIRATE READER), for example, another cell phone having a microcontroller capable of executing a piracy program complying with the described functions, or a computer provided with a card reader and simulating a router. Since card SIM1 has never met the NFC router of the pirate device or a router emulated by this device, it generates a new synchronization identifier SYNCID2. It sends back gate identifiers RFGATEID and GATEID to create the corresponding pipes. The pirate router then assigns, to at least one pair of gates, a pipe FPIPEID which corresponds to a gateway between the router and an external gate of the microcontroller instead of associating gate GATEID to an RF gate. Identifier FPIPEID and identifiers RSYNCHID2 and RD2 are then loaded into a falsified card SIM2. Card SIM2 then contains a routing table associating gates RFGATEID and GATEID with pipe FPIPEID.

Then, card SIM2 is introduced into telephone 1. Identifiers SYNCID2 and RD2 are then transferred to CLF router 18 to create pipe FPIPEID between gates designated as GATEID and RFID. This amounts to modifying the routing table of the router so that when the pipe between gates GATEID and RFGATEID is called, the assigned pipe is pipe FPIPEID instead of PIPEID.

The assignment of pipe FPIPEID may take various forms according to the way in which the pipes are assigned to the gates in the router. For example, a phase of observation of the gate assignment is gone through by placing card SIM2 in the router to observe the pipe assignment method, before introducing card SIM2 into the pirate reader.

The "real" card SIM1 is then placed back into telephone 1. Since the CLF router knows identifiers RD2 and SYNCID2, the card considers that it "knows" the router and does not recreate pipes therewith. When card SIM1 requests a communication towards gate RFGATEID, the router uses the assigned pipe FPIPEID.

The GSM terminal has effectively been hacked, that is, a pipe FPIPE (or ATPIPE, FIG. 2) has been created between a gate GATEID of the SIM card and a gate of microcontroller 12, while card SIM1 believes that this pipe connects its gate GATEID to gate RFGATEID. This pipe can then be diverted for a distant access over the GSM network from another terminal (FIG. 3). The downloading of pirate application PA can be performed either subsequently or at the same time as the pirate pipe generation.

There exist various possibilities according to the presented device 1 to access the routing table thereof. For example, the routing table may be read from. If this is not possible, it is possible, when card SIM1 is in the pirate reader, to emulate an operation of the CLF circuit, in order to obtain the full configuration stored in this card. A pirate card SYNC2 or a card emulator may also be used to extract the data from the routing table in phone VALID1.

It can thus be seen that it is possible to parameterize the diverting of a communication pipe between a security module and an NFC router to create a pipe between this module and the telephone microcontroller, external to the NFC router.

In order for the user of telephone 1 not to notice the piracy, even when he uses his contactless mode, the pirate application must comprise the function of redirecting pipe FPIPE towards the RF circuits of the router when a data request towards the SIM card is transmitted by router 18.

FIG. 6 partially shows, in the form of blocks, elements of a mobile telecommunication device according to an embodiment of a mechanism of protection against the above-described type of attack.

As in FIG. 1, it features a central processing unit 12 (TH—Terminal Host) capable of communicating with a contactless router 18 (CLF), itself capable of exchanges with a security module 14 (for example, a SIM card). Usually, router 18 comprises a routing table (not shown) putting a pipe identifier PIPEID in correspondence with two gate identifiers GATEID between which the pipe is created.

According to the embodiment of FIG. 6, security module 14 comprises a filtering table containing, for each function requiring a processing by the SIM and having a request sent by router 18, parameters enabling the security module to determine whether this function must be authorized or not. Thus, the security module is modified to contain, in a non-volatile memory 145 (NVM) that it contains, a table 146 determining, from a function called by router 18, whether the transaction must be authorized or not.

FIG. 7 illustrates a simplified embodiment of a table 146 stored in a non-volatile memory (145, FIG. 6) of a security module. This table stores, in front of an identifier of application or function APPLI called by router 18 and of the origin of the request (Log Source ID), the right (Y) or not (N) to access the SIM card. According to this right, the SIM card answers that the function is or not accessible. A more detailed example of a table will be illustrated hereafter.

Figure 8:
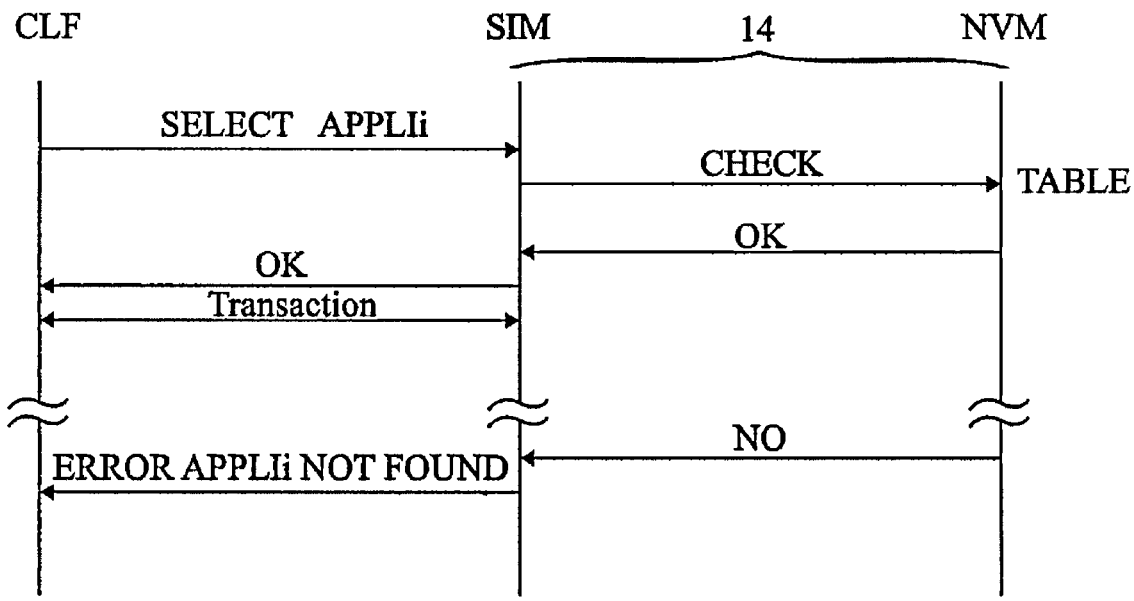
FIG. 8 very schematically illustrates an embodiment of the protection mechanism.

FIG. 8 illustrates an implementation mode of the protection mechanism, based on the use of a table such as illustrated in FIG. 7.

Each time a logical source attempts to use router 18 (CLF) to transmit an access request to an application i (APPLIi) of security module 14 (SIM), it sends a selection request SELECT to the SIM card, which transits through the router. The SIM card checks (CHECK), from the table stored in its non-volatile memory (NVM), whether the rights are granted to this application.

In the high portion of FIG. 8, the access is assumed to be authorized. The microcontroller of the SIM card reads the result from the non-volatile memory (OK) and transmits to the logical source, via router 18, an acceptation of the selection request for this application. The transaction can then be performed between the logical source and the SIM card.

In the low portion of FIG. 8, the table is assumed to return a denial of the rights (NO) for the selected application. The SIM card then returns an error message (ERROR) to the router, according to which the application is not present or is not available in the card (APPLIi NOT FOUND).

Figure 9:
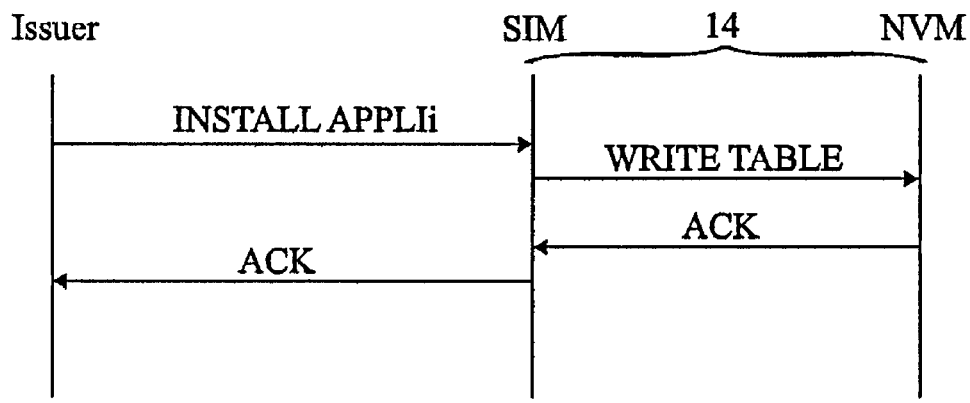
FIG. 9 very schematically illustrates a configuration mode of a security module for the implementation of embodiments.

FIG. 9 illustrates an embodiment of an initialization step of the SIM card for the implementation of the above-described method.

The issuer of the SIM card must store, in non-volatile memory NVM, the rights of the different applications. To achieve this, each application instance (code of the application plus set of parameters necessary for its execution) is installed in the SIM card (INSTALL APPLIi), which causes the writing of the corresponding rights into the table (WRITE TABLE) and returns an acknowledgement ACK to the installation device. This device generally is a terminal for customizing the SIM card, and more generally any system for parameterizing or customizing a security module, also comprising usual over-the-air mobile device update systems.

The above tables illustrate a more complete example of the content of a table in a security module according to another embodiment.

This example more specifically applies to an NFC router compatible with the ETSI standard. In this standard, each pipe (PIPE) connects two gates, each belonging to a circuit (HOST) connecting at least one gate. Each pipe connected to the security module may be characterized by three pieces of information: the pipe identifier (PIPE ID), the circuit identifier (Ext Host ID), and the identifier of the addressed gate. These data are stored in the CLF router. It is provided to store them in the security module by completing them with the information relative to the logical source Logical Source ID.

Table I hereafter provides in its right-hand column a description of the corresponding logical source.

TABLE I

| PIPE ID | Ext Host ID | Ext Gate ID | LOGICAL SOURCE ID | Logical Source Description |
|---|---|---|---|---|
| 00 | 00 (CLF) | — | 00 | CLF - Gate management |
| 01 | 00 (CLF) | — | 00 | CLF - Administration gate |
| 02 | 00 (CLF) | 01 | 00 | CLF - Owner pipe |
| 03 | 00 (CLF) | 21 | 01 | RF Card Emulation - Type B |
| 04 | 00 (CLF) | 23 | 01 | RF Card Emulation - Type A |
| 05 | 00 (CLF) | 24 | 01 | RF Card Emulation - Type C |
| 06 | 00 (CLF) | 11 | 02 | RF Reader - Type B |
| 07 | 00 (CLF) | 13 | 02 | RF Reader - Type A |
| 08 | 00 (CLF) | 04 | 00 | CLF - Echo |
| 09 | 00 (CLF) | 05 | 00 | CLF - Identity Management |
| 0A | 01 (TH) | 33 | 04 | SE Direct Connection |
| 0B | 01 (TH) | 41 | 05 | TH - Connectivity |
| 0C | 01 (TH) | 04 | 03 | TH - Echo |
| 0D | 01 (TH) | 05 | 03 | TH - Identity Management |

The access rights are conditioned by the logical source identifier.

Examples of logical source identifiers are provided in table II shown hereafter:

TABLE II

| Logical Source ID | Logical Source Description |
|---|---|
| 00 | CLF administration gates |
| 01 | RF card emulation |
| 02 | RF Reader |
| 03 | TH Host administration gates |
| 04 | Direct connection to the security module |
| 05 | Connection according to ETSI standard 102622 |

This table is used to define the right of access to the security module as illustrated in FIG. 7.

The implementation of the described embodiments requires no modification of the CLF router. Only the security module is concerned. Accordingly, the implementation of these embodiments is compatible with existing devices.

Various alterations, modifications, and improvements will occur to those skilled in the art. In particular, the embodiments have been described in relation with an example of a security module formed of a SIM card. It however more generally applies to any security module capable of communicating with the NFC router. Further, the implementation of the embodiments is within the abilities of those skilled in the art, using programming tools usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method to protect a security module of a telecommunication device equipped with a near-field communication (NFC) router against an attempt to divert a communication channel, comprising:
    forming the communication channel between a gate of the security module and a gate of the NFC router;
    storing in a non-volatile memory in the security module rights of access to information contained within the security module;
    creating a table in the non-volatile memory, the table containing, for each request capable of being received by the NFC router, a router gate identifier and an identifier of a logic source from which the request originates;
    for each request from the NFC router to the security module, verifying by said security module the rights of access to the information contained within the security module according to the origin &the request; and
    rejecting an attempt to divert the communication channel based on the verifying.

2. The method of claim 1, wherein the security module only allows a transaction if the request originates from a near-field communication.

3. The module of claim 1, wherein the right of access is conditioned by the logical source.

4. A telecommunication device equipped with a near field communication router and with the security module of claim 1.

5. A telecommunication device arranged to resist an attempt of diversion of a communication channel that passes secret information, comprising:
    a security module having at least one gate;
    a near-field communication (NFC) router having at least one gate, the at least one gate of the NFC router connectable to the at least one gate of the security module to form the communication channel that passes the secret information;
    a non-volatile memory associated with the router, the non-volatile memory arranged to store rights of access to the secret information and further arranged to store a table containing, for each request capable of being received, a router gate identifier and an identifier of a logic source from which the request originates, wherein, for each request from the router to the security module, said security module is configured to verify the rights of access to the information contained within the security module according to the origin of the request and reject an attempt to divert the communication channel based on verifying the rights of access.

6. The telecommunication device of claim 5, wherein the security module is configured to ignore a transaction when a request does not originate from an NFC terminal.

7. The telecommunication device of claim 6, wherein ignoring the transaction includes transmitting an error message.

8. The telecommunication device of claim 5, wherein the stored table is configured to store information representing an NFC reader, an emulation device, and a terminal host.

9. A method to protect a security module of a mobile device having a near-field communication (NFC) router integrated therein, comprising:

provide an input structure to the NFC router configured to receive requests for access to the security module;

providing, in a non-volatile memory associated with the NFC router, rights of access information associated with each request for access to the security module that is capable of being received, the rights of access information identifying valid requestors to information contained within the security module, the rights of access information including a router gate identifier and an identifier of a logic source from which the request originates;

receiving, at the NFC router, a request from a logic source attempting to divert a communication channel between a gate of the security module and a gate of the router;

retrieving, from the non-volatile memory associated with the NFC router, the rights of access information associated with the logic source attempting to divert the communication channel;

verifying, based on the retrieved rights of access information, whether the attempted diversion is permitted; and allowing or preventing the diversion based on the verifying.

10. The method of claim 9, wherein the rights of access information is retrievable according to an origin of the request to divert the communication channel.

11. The method of claim 9, wherein the security module only allows a transaction if the request originates via a near-field communication.

12. The method of claim 9, wherein the security module only allows a transaction if the request originates from an NFC terminal.

13. The method of claim 9, comprising:

ignoring, by the security module, a transaction when a request does not originate from an NFC terminal.

14. The method of claim 13, comprising:

transmitting an error message when a request not originating from an NFC terminal is received.

15. The method of claim 9, wherein the rights of access information includes information representing an NFC reader, an emulation device, and a terminal host.

16. The method of claim 9, wherein the rights of access information is stored in a table in the non-volatile memory of the security module.

* * * * *